(12) United States Patent
McEwan

(10) Patent No.: US 8,061,389 B2
(45) Date of Patent: Nov. 22, 2011

(54) DUCT LEAKAGE CONTROL

(75) Inventor: Ian Kenneth McEwan, Abderdeen (GB)

(73) Assignee: Brinker Technology Limited, Aberdeen (GB)

( * ) Notice: Subject to any disclaimer, the term of this patent is extended or adjusted under 35 U.S.C. 154(b) by 1143 days.

(21) Appl. No.: 10/275,742

(22) PCT Filed: May 8, 2001

(86) PCT No.: PCT/GB01/02002
§ 371 (c)(1),
(2), (4) Date: Feb. 20, 2003

(87) PCT Pub. No.: WO01/86191
PCT Pub. Date: Nov. 15, 2001

(65) Prior Publication Data
US 2003/0160391 A1    Aug. 28, 2003

(30) Foreign Application Priority Data

May 9, 2000    (GB) .................................. 0011190.6

(51) Int. Cl.
*F16L 55/16*    (2006.01)
(52) U.S. Cl. ........................................... 138/98; 138/99
(58) Field of Classification Search ............... 73/405 R, 73/866.5; 138/98–99; 405/184.1, 184.2, 405/184
See application file for complete search history.

(56) References Cited

U.S. PATENT DOCUMENTS

| | | | | |
|---|---|---|---|---|
| 3,144,049 A * | 8/1964 | Ginsburgh | ...................... | 138/97 |
| 3,298,399 A | 1/1967 | Slade | .............................. | 138/97 |
| 3,837,214 A * | 9/1974 | Guest | ......................... | 73/40.5 R |
| 3,974,680 A * | 8/1976 | Beaver | ........................ | 73/40.5 R |
| 4,016,748 A | 4/1977 | Boyens | ........................... | 73/40.5 |
| 4,402,213 A * | 9/1983 | Hogan | ....................... | 73/40.5 R |
| 4,582,091 A | 4/1986 | Ells | | |

(Continued)

FOREIGN PATENT DOCUMENTS

| | | |
|---|---|---|
| EP | 0 303 048 A1 | 5/1989 |
| GB | 1 101 870 | 1/1968 |
| GB | 2 334 532 | 8/1999 |
| GB | 2 400 898 A | 10/2004 |

OTHER PUBLICATIONS

Merriam-Webster's Collegiate Dictionary, Tenth Edition, pp. 660, 724 and 1079.*

*Primary Examiner* — Vishal Patel
(74) *Attorney, Agent, or Firm* — Woodcock Washburn, LLP

(57) ABSTRACT

The invention relates to the control of leakage from ducts, such as fluid-carrying pipework, without necessarily requiring direct access to the leakage site itself; since leakage sites are often difficult to locate with the necessary degree of precision to permit access to reliably be made thereto, and moreover, even if a site can be located, it is not always convenient or economically possible to secure access thereto. The invention provides an apparatus and methods for duct leakage control wherein a sealing element (1) is introduced into the duct and is automatically drawn or otherwise guided to the locality of a leak; the element being caused, by reason of a pressure differential attributable to the leak, to move into and stem or seal the leak. The sealing element may comprise a plurality of individual members of differing buoyancy, each capable of being carried along at a predetermined level in the duct by the flow of fluid therein. The sealing element may carry a tagging device which can be used to assist in locating the leakage site.

8 Claims, 5 Drawing Sheets

U.S. PATENT DOCUMENTS

| | | | |
|---|---|---|---|
| 4,714,095 A * | 12/1987 | Muller et al. | 138/98 |
| 4,894,539 A * | 1/1990 | Hurst | 73/40.5 R |
| 4,913,950 A | 4/1990 | Riesinger | 428/64 |
| 5,680,885 A * | 10/1997 | Catallo | 138/98 |
| 6,161,588 A * | 12/2000 | Bellamy et al. | 138/98 |
| 6,206,049 B1 * | 3/2001 | Ward | 138/98 |
| 6,615,875 B2 * | 9/2003 | Adolphs et al. | 138/98 |
| 6,931,952 B2 * | 8/2005 | Rantala et al. | 73/866.5 |

* cited by examiner

Fig.5
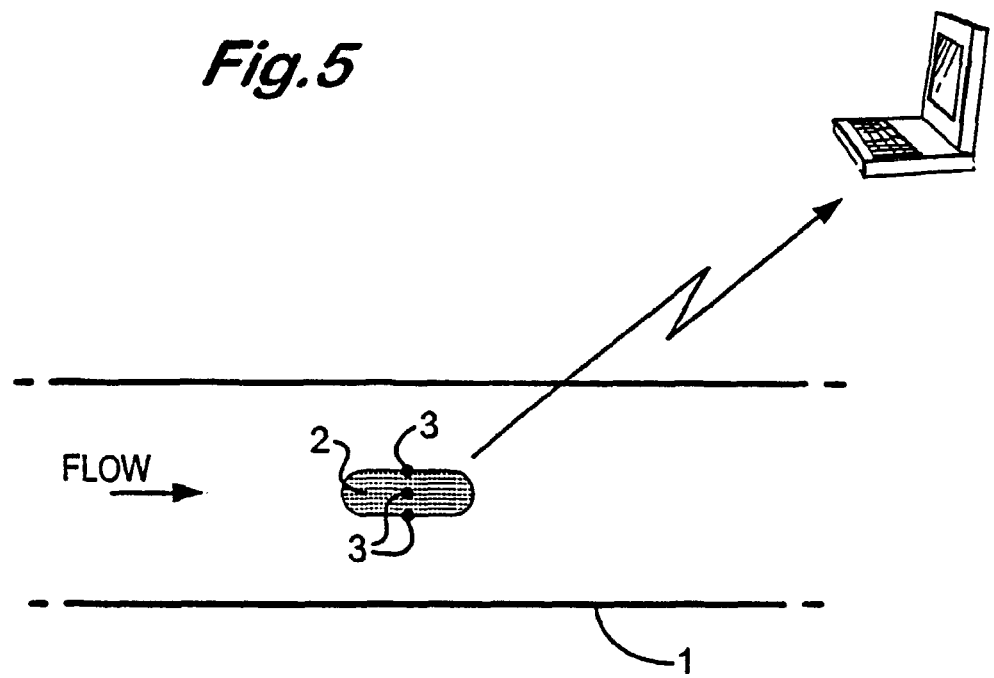
Fig.6
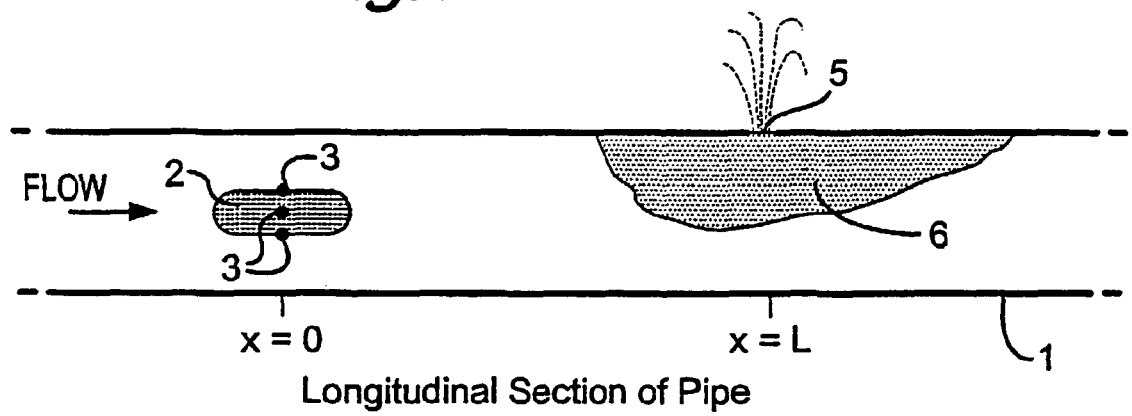
Longitudinal Section of Pipe
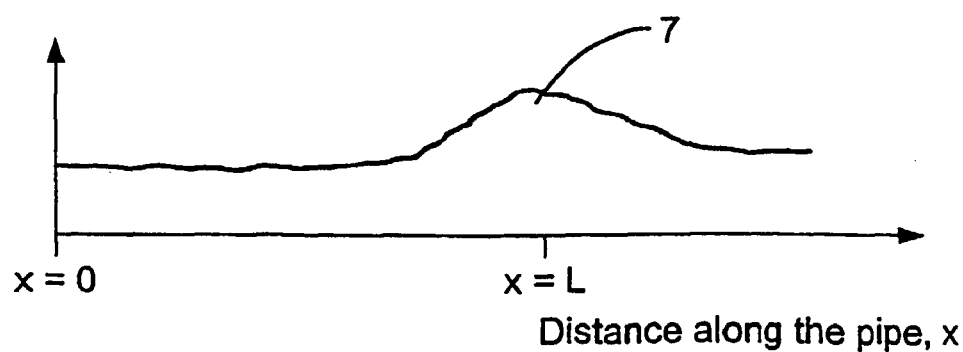
Distance along the pipe, x

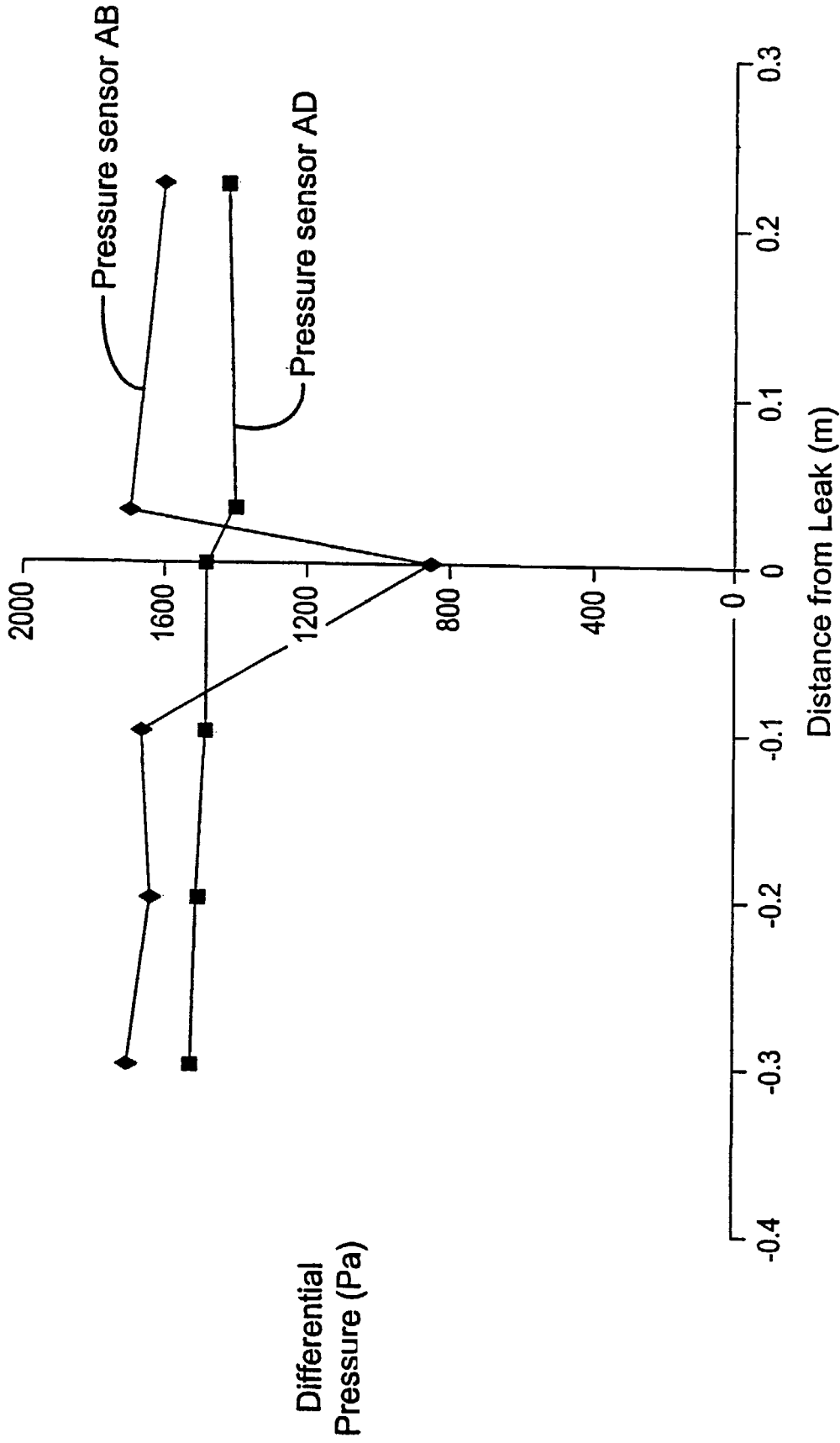

DUCT LEAKAGE CONTROL

This application is the United States national phase of PCT application number PCT/GB01/02002, which claims priority from international patent application number GB0011190.6 filed on May 9, 2000.

BACKGROUND OF THE INVENTION

1. Field of the Invention

This invention relates to the control of leakage from ducts, such as fluid-carrying pipework, and aims to provide means to reduce or prevent leakage from apertures compromising the integrity of ducts and attributable to causes such as manufacturing faults or blemishes, rust or other corrosive activity, piercing damage, age of pipework, or joints.

2. Description of Related Art Including Information Disclosed Under 37 CFR 1.97-1.99

It is usually the case, for one reason or another, that significant areas of fluid-carrying ducts, once installed as part of a pipework system, become substantially inaccessible. For example, mains water distribution systems employ vast lengths of buried pipework which involves expensive and time-consuming excavation to expose, for scrutiny and/or repair, areas of pipe from which leakage is suspected.

An efficient technique for locating leakage without resort to major excavation is thus required, and such a technique is described, for example, in International Patent Application No. PCT/GB 99/03742.

That application describes a technique wherein a sensor means is provided within the pipe for detecting characteristics of the fluid. The detected characteristics are recorded and used to evaluate a fluid flow field characteristic which is compared with a reference fluid flow field characteristic for that pipe to obtain thereby data concerning a leak. The comparison may usefully be effected by means including a neural network.

It is thus known that leakage can be localised without excavation or other expensive investigative techniques. However, it may still be necessary to excavate or otherwise uncover the leaking pipework in order to control the leak, and the present invention seeks to reduce or eliminate the need for such activities.

Moreover, there are occasions, particularly in the oil, gas and nuclear industries, when a rapid response to leakage or to a lack of containment generally) is essential. In addition there is often the need, having stemmed the initial flow of fluid from a leak, to accurately locate the leak so that a permanent repair may be made, or other remedial action taken. Still further, there may be a need in some operational circumstances to shield or protect workers, engaged in the location of leaks and/or the associated repairs, from the leaking fluid.

SUMMARY OF THE INVENTION

Certain embodiments of the invention are intended to address at least one of the foregoing requirements.

According to the invention, there is provided a method of controlling leakage of fluid from a duct along which the fluid is constrained to flow, wherein a plurality of individual membrane sealing elements are introduced into the duct and carried along the duct by the flow of said fluid; and wherein, at the locality of a leak, at least one of the sealing elements is captured by a pressure differential associated with the leak and is thereby drawn to and held in position at the leak for stemming or sealing it.

According to a further aspect of the invention, there is provided apparatus for controlling leakage of fluid from a duct along which the fluid is constrained to flow, the apparatus comprising a plurality of individual membrane sealing elements for introduction into the duct, and capable of being carried along the duct by the flow of said fluid; wherein, at the locality of a leak, at least one of the sealing elements is capable of being captured by a pressure differential associated with the leak and thereby drawn to and held in position at the leak for stemming or sealing it.

In one embodiment, the sealing elements exhibit differing buoyancies. The sealing elements may also be of differing sizes and shapes.

Systems utilising such sealing sealing elements do not require the location of a leak to have been previously determined by means such as those described in the aforesaid International Patent Application.

Preferably the sealing member supports, in the form of a coating or otherwise, a medium capable, when forced into contact with the inside wall of the duct, of adhering strongly thereto, thereby anchoring the membrane firmly in place across the leaking area of the duct wall and sealing the leak.

In other preferred embodiments, the sealing elements may be provided with a device capable (either by itself or in co-operation with another element or component) of signalling the location of the sealing elements, at least from such time that the sealing element becomes stationary, in a position sealing a leak.

The device may be a passive device such as an antenna loop or similar, the proximity of which can be sensed by a mobile intelligent unit inside the pipe or a suitable external pick-up. Alternatively, an active device such as an infra-red, acoustic, radio or optical sender may relay signals either directly to the environment outside of the pipe or to a mobile intelligent unit inside the pipe.

BRIEF DESCRIPTION OF DRAWINGS

In order that the invention may be clearly understood and readily carried into effect, embodiments thereof will now be described, by way of example only, with reference to the accompanying drawings, of which:

FIG. 5 shows schematically a leak location apparatus for use in accordance with the present invention;

FIG. 6 shows a relationship between the apparatus of FIG. 5 when provided in a pipe with a leak and a measurement of flow field;

FIG. 8 illustrates one example of detected pressure characteristics of a leak using the sensor array of FIG. 7.

DESCRIPTION OF THE PREFERRED EMBODIMENT(S)

Figure 1:
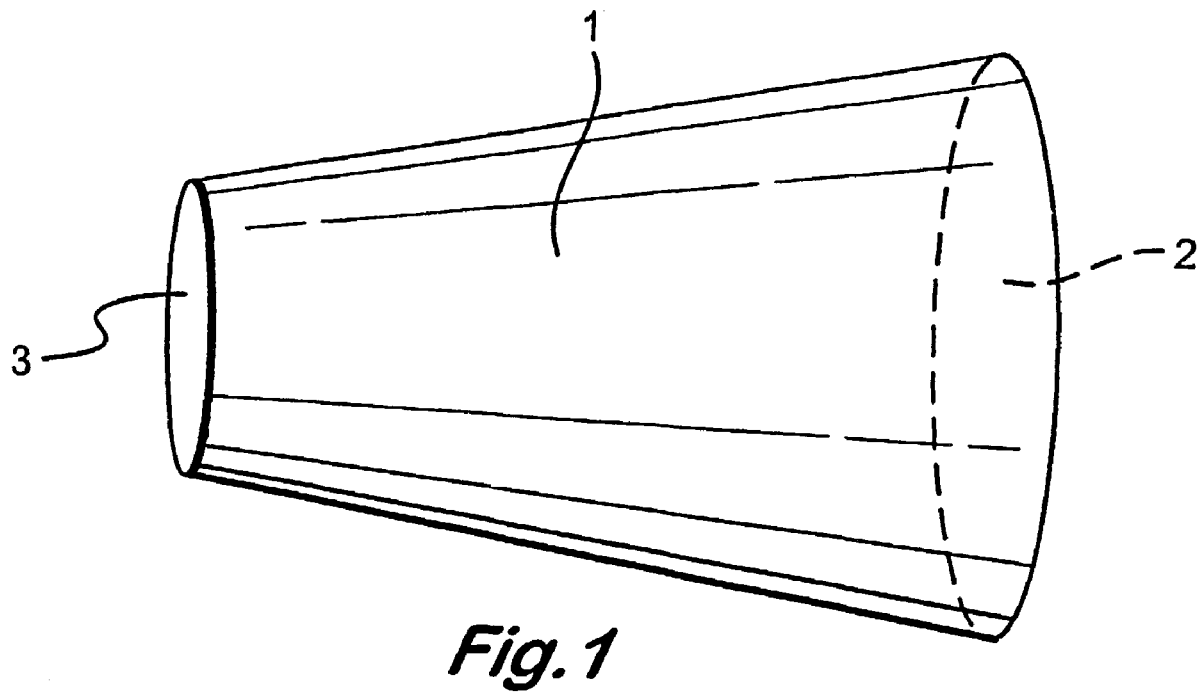
FIG. 1 shows a sealing element arrangement for use in accordance with the invention.

The present invention can be applied to fluids generally, for example, oil, water, natural gas etc. The present embodiment will be described with respect to water.

As a fluid passes through pipework, it can be represented as a flow field varying according to the spatial location within the pipe. The characteristics of the fluid flow field will vary according to a large number of parameters, including for example pipe size (diameter), fluid pressure, pipe surface characteristics, the type of flow, side passages, directional variation of the pipe etc. Another parameter that will modify the fluid flow field characteristics is the presence of a leak. Indeed, the degree of modification of the fluid flow field characteristics will vary according to the form of leak, for example its size, type, geometry and location within the pipe.

However, it has been found that one of the particular problems in detecting a leak is that the effects of the leak on the fluid flow field are very difficult to detect. There are a number of reasons for this. One reason is that the overall flow of the water in the pipe is not laminar. Instead, there is a continual background turbulence within the overall flow. This tends to mask the modifications to the fluid flow field resulting from the leak. Another reason is that the modifications to the fluid flow field resulting from the leak are extremely small and highly localised. For example, the localised drop in pressure relative to the gross or ambient pressure in the pipe that results from a leak of diameter a is of the order of ¼% with the effect of the leak disappearing within a pipe length of 5$a$ to 10$a$ before and after the leak. This makes it extremely difficult to detect a leak at all and in particular to pin point the location of a leak.

The inventor considers that a part of the reason for the very small localised effect of a leak is that the flow within the pipe recovers very quickly after the leak. In fact, the disturbance in the flow field characteristic probably derives from a velocity component of the leaking water as it flows through the leak, this velocity component being essentially normal to the direction of the gross flow of water in the pipe. The effect of this component will be small within the terms of the gross water flow and will disappear rapidly either side of the leak.

By varying the aforementioned parameters with assorted forms of leaks whilst monitoring the characteristics of the fluid flow field, and by using various processing techniques, it is possible to correlate leak form with fluid flow field characteristics thereby enabling the location of leaks and determination of leak form.

Referring to FIG. 5, a leak location system comprises a sensor means, in the form of a capsule 2, which is located in a pipe section 1 through which water is flowing in the direction of the arrow. The pipe section has preset parameters. The capsule has dispersed around its periphery a plurality of sensors 3 for measuring a fluid flow field characteristic within the pipe interior. Measurements taken by the sensors 3 are communicated to a remote computer 4. In this respect, the measurements may be communicated in real time, for example by way of a transmitter on the capsule and a suitable receiver for the computer. Alternatively, the measurements may be stored in a memory on the capsule, for example on a smart card, the data from which can be transferred to the computer following a passage of the capsule within the section of pipe.

The capsule 2 is arranged to traverse along the interior of the pipe in the flow of water. In this respect, the capsule may rely on the flow of water to carry it through a designated section of pipe, or it may be provided with propulsion means for affording it independent movement within the flow. The capsule is provided with location means whereby the location of the capsule within the pipe section can be determined. The location means may comprise, for example, ultrasonic sensors for accurately measuring distances to pipe walls and/or GSM technology for accurately determining the position of the sensor within e.g. a long stretch of pipe.

A movement control means can also be provided for adjusting the spatial position of the capsule. Such movement control means may include radio controlled vanes or fins or the like for guiding the capsule within the flow.

The data from the measurements of the sensors are processed by a processing means and stored in memory. A series of data are obtained from pipe sections having different parameters and with and without leaks of varying forms whereby a library of fluid flow field characteristics is built up which can be differentiated according to these parameters. By using artificial neural networks and repeating the taking of data a large number of times, the artificial neural network learns to classify the fluid flow field characteristics with more and more accuracy.

The use of the above described system is now described in relation to FIG. 6.

In order to examine a section of pipe, a suitable inlet in the pipe is required for insertion of the capsule into the flow. Once inserted, the capsule 2 traverses along the pipe taking separate pressure measurements from the individual pressure sensors 3. Such measurements are recorded within the capsule. The fluid flow field characteristics as represented by the pressure measurements are modified by the presence of a leak 5 as shown by the pressure contour 6. Hence, the pressure measurements taken by the sensors on the capsule provide information about the presence of the leak according to the graphical plot of pressure in relation to distance along the pipe section, as shown in the figure. A leak 5 is positioned at the point x=L along the length of the pipe, the plot showing this to be an area of pressure fluctuation. The plot is only illustrative and will vary depending on the geometry of the leak.

When analysing the measurements, details of the pipe geometry can be entered in the computer 4. In this manner, the relevance of a modification of the fluid flow field characteristic can be more accurately considered.

Thus, the measurements taken by the capsule are not necessarily particularly helpful on their own in establishing conditions within the pipe, e.g. the position and geometry of the leak. In order to interpret the measurements in detail, they are compared with similar measurements from other pipe sections having known internal conditions. Such known measurements may be held by the computer in a library of prior measurement and associated pipe internal condition data. In this regard, the measurements can be used to form a fluid flow field signature of the pipe under examination as shown generally by the plot in FIG. 6. When suitably categorised or classified, such a signature can be readily compared with signatures formed for prior known pipe internal configurations to draw out relevant characteristics.

As such, the measurements themselves do not need to be fully understood, merely compared with previous measurement data having known associated pipe characteristics.

In carrying out the analysis of the measurements, neural networks may be employed. Pre-processing of the measurements can be conducted using several techniques such as principal component analysis, wavelet transforms, and higher order spectral analysis. With use of pre-processing of the signal, it is possible to extract the maximum amount of detail about pertinent aspects of the signatures whilst minimising unwanted information and noise.

Figure 7:
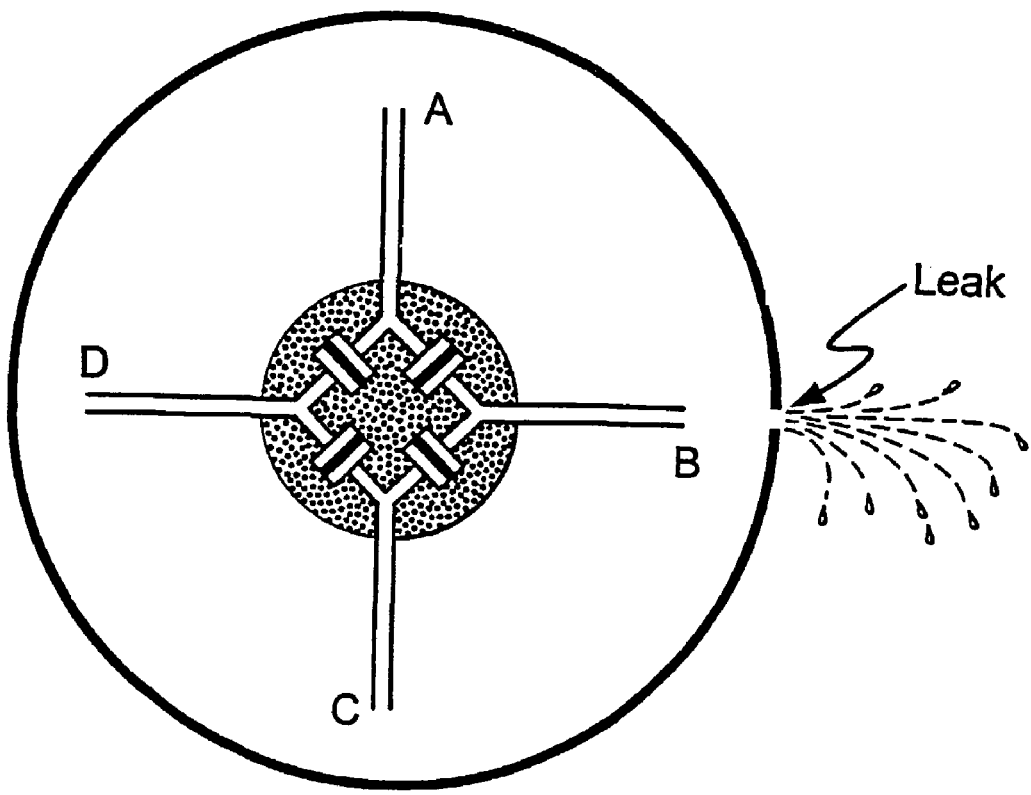
FIG. 7 illustrates an array of differential sensors for use in the apparatus shown in FIG. 5.

FIG. 7 illustrates an array of sensors which provides a more sensitive form of sensor means that can be applied to the capsule 2 shown in FIG. 1. In particular, four differential pressure sensors (e.g. Honeywell 24 PCA) are provided in the capsule to detect the differential pressure between four sensor outlets or tapping points A to D distributed radially around the body of the capsule. Thus, the differential pressure between outlets A-B, B-C, C-D and D-A can be detected. Since absolute pressures are not detected, the sensors can resolve small localised pressure differentials enabling the detection of the small pressure drops resulting from leaks. Furthermore, due to the angular arrangement of the outlets, spatial location of the leak is provided.

With regard to the term pressure differential, it will be appreciated that the pressure will depend on the depth of the outlet in the water. For example, each 10 mm of depth represents 100 Pa. Thus, the sensors can easily detect a differential pressure between the outlets in the presence of a leak.

The pressure field in the vicinity of the leak can be described by the equation:—

$$\Delta P = \frac{1}{4}\left(\frac{a}{r}\right)^4 [p_0 - p_a]$$

where
$\Delta P$ is the magnitude of the pressure variation due to the leak
$a$ is the length scale at the leak (e.g. the radius for a circular hole)
$r$ is the distance from the leak
$p_o$ is the ambient pressure in the pipe
$p_a$ is the pressure outside the pipe (this could be close to atmospheric Thus, for instance, if $p_o$=10 bar=$10^6$ Pa, $p_a$=1 bar=$10^5$ Pa, a=0.01 m, r=0.05 m, then $\Delta P$=360 Pa.

FIG. 8 illustrates an example of detected fluid flow characteristics in the form of pressure. In particular, this figure shows results from a pipe of 0.2 m diameter with a water flow rate therethrough of 20 l/s at a pressure of 1 bar ($10^5$ Pa). A hole of diameter 0.01 m has been made in the pipe at a specific location providing a leakage of 0.7 l/s. The capsule 2 is moved incrementally along the pipe to take readings. In this figure, the increments are 0.1 m. The capsule is moved incrementally in this case so that localised turbulence caused by the capsule subsides to provide more stable readings. However, the size of the increment can be reduced and by application of suitable pre-processing techniques as mentioned above, the instability of the readings resulting from localised turbulence can be filtered out to provide a cleaner overall characteristic or signature.

It can be seen from FIG. 8 that a comparison of the detected characteristics for the differential detector for outlets A-B and the differential detector for outlets D-A shows a marked effect around the location of the leak. Indeed, from a point some 0.1 m upstream of the leak, the differential pressure decreases to a minimum at the leak and after the leak is passed the differential pressure recovers within about 0.03 m. The drop in differential pressure is almost 50% at the minimum.

The difference in differential pressure between the lines for sensors A-B and A-D in FIG. 5 could either be an intrinsic instrument offset or a relative tilt of the sensors.

Figure 4:
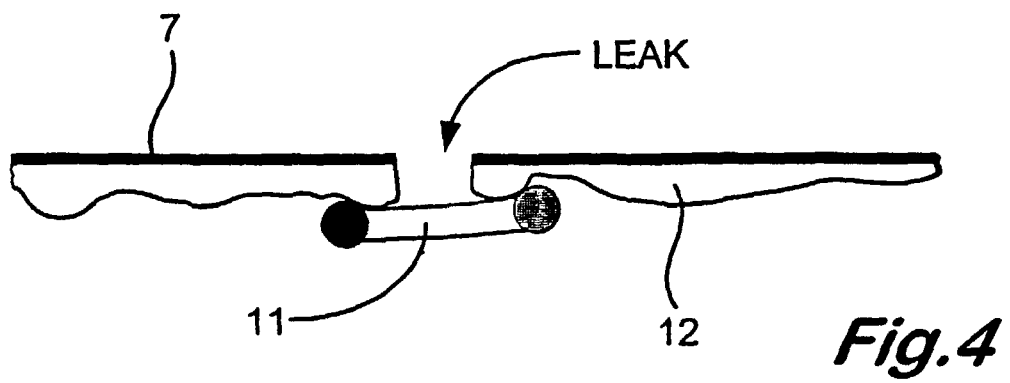
FIG. 4 shows schematically a sealing element of the kind shown in FIGS. 3(a) and 3(b) in place to seal or stem a leak.

It has been found that the magnitude of the leak is related to the pressure drop measured by the differential pressure sensors. Moreover, it will be noted that since the outlets D-A are remote from the position of the leak, no differential pressure drop is detected. This further illustrates the localised nature of the disturbance in the fluid field characteristic. Whilst the detected magnitude of the pressure drop is related to the magnitude of the leak, it is apparent that the further from the leak, the smaller the magnitude of the pressure drop. Nevertheless, by using the differential pressure from openings B-C (not shown in FIG. 4 for convenience), it is possible to still resolve out a pressure drop that is representative of the magnitude of the leak.

Whilst the results of FIG. 8 show a simple pressure drop for tapping points A-B that is compared with the reference pressure drop for tapping points D-A, it will be appreciated that by using the analytical techniques mentioned above, greater accuracy in leak detection and information about the leak in relation to specific pipework can be obtained.

Referring now to FIG. 1, there is shown a related arrangement of a sealing element 1 in the form of a flexible membrane comprising a sheet of plastics or other suitable material having one pair of opposing sides joined together, and being cut so as to present open ends 2 and 3 and to adopt a frustoconical form when filled with the fluid in a pipe (not shown in FIG. 1).

In this related arrangement, it is assumed that the location of a leak is known as a result, for example, of the use of the sensor described with reference to FIGS. 5 to 8 and as described in the aforesaid International Patent Application and the sealing element 1 is thus intended to be transported to the area of the leak, for example by being towed through the subject pipework behind the sensor actually used to locate the leak, or behind another device that is guided to the relevant area, either by the sensor itself or by remote transmitter means.

Figure 2:
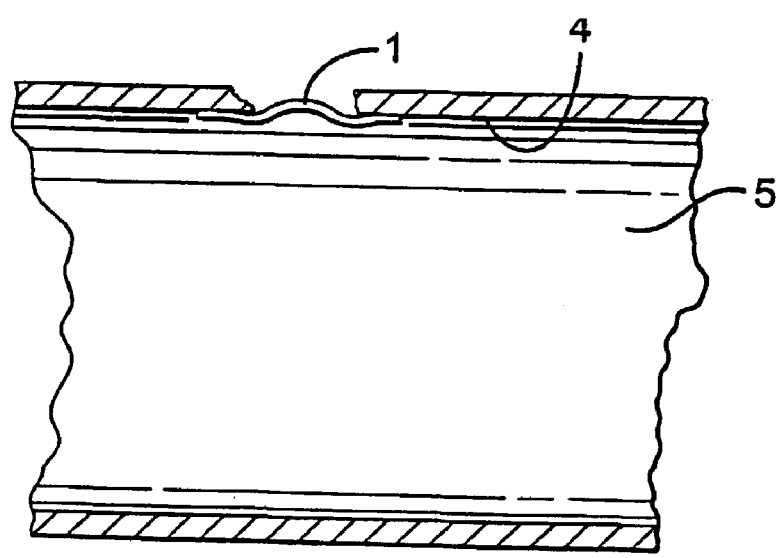
FIG. 2 shows schematically the element of FIG. 1 in place to seal or stem a leak.

When the sealing element 1 has been transported sufficiently close to the vicinity of the leak, the pressure differential associated with the leak, which, in a mains water pipe can be as much as 16 bar, is effective to draw the element 1 into the leakage aperture itself, as shown in FIG. 2, and the doubled sheet is thus pulled against the inner wall 4 of the pipe, shown in part at 5. This effectively seals, or at least stems, the leak. Preferably the sheet of the sealing element 1 carries a suitable bonding agent which enables the element to be firmly adherent to the inner wall 4. The bonding agent may be contained in microcapsules which burst in response to the pressure imparted to the element 1 when it is in position to seal the leak.

Pressure sensitive release means may be incorporated in the towing link which enable the towing vehicle to leave the sealing element behind at the site of the leak and proceed alone to a suitable collection point. Alternatively, the towing vehicle (assuming that the leak sensor itself is not used for that purpose) may be regarded as disposable and remain attached to the sealing element with any motive power disabled by remote control.

Instead of using a sealing element of the "windsock" shape shown in FIG. 1, one or more simple streamers can be used if preferred. If streamers are used, there may usefully be several, these having varying degrees of positive and negative buoyancy, as well as some of neutral buoyancy which can drift from side to side. By this means, there is provided an increased probability that one or more streamers will be positioned within the pipe so as to be "captured" by the pressure differential associated with the leak, and thus able to move into the leaking area and effect the desired sealing or stemming.

In any event, once the sealing element or elements have been deployed to seal or stem the leak, it is envisaged that the leak sensor device will be re-employed to investigate the extent to which the action has been successful. If the action has not been successful, and/or has succeeded only to a degree, a follow-up operation may be carried out, using any of the procedures described above. In the event that a follow-up operation is required to improve or complete the sealing, then sealing elements of different dimensions and/or of different materials to those used in the first operation may be employed. Moreover, sealing elements used in a follow-up operation may carry a different bonding medium to that carried by the element(s) used in the original operation, bearing in mind that they will need to bond primarily to the material of the element(s) already in place, rather than to the wall 4 of the tube 5. In some cases, especially where the degree of leakage remaining after a first operation is relatively small, the element(s) used in a follow-up operation may not be required to carry any bonding material at all, especially if the material of the elements exhibits a degree of surface roughness that provides frictional inter-engagement.

In accordance with the invention, sealing elements of the kind described above can be introduced into pipework without any knowledge of the location of a leak and/or without the use of towing or steerage devices, thereby to be carried along the pipe by the flow of fluid therein and attracted to the site of a leak by the aforementioned pressure differential. If this approach is to be adopted, however, it is preferred that sealing elements of the kind shown at 6 and 11 in FIG. 3 are employed.

Figure 3A:
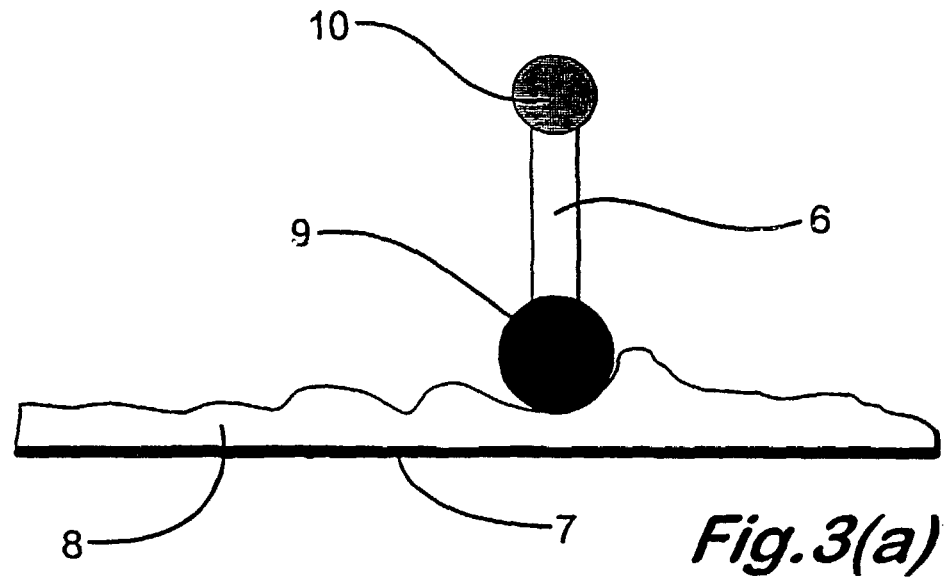
FIGS. 3(a) and 3(b) show sealing elements for use in accordance with the invention.
Figure 3B:
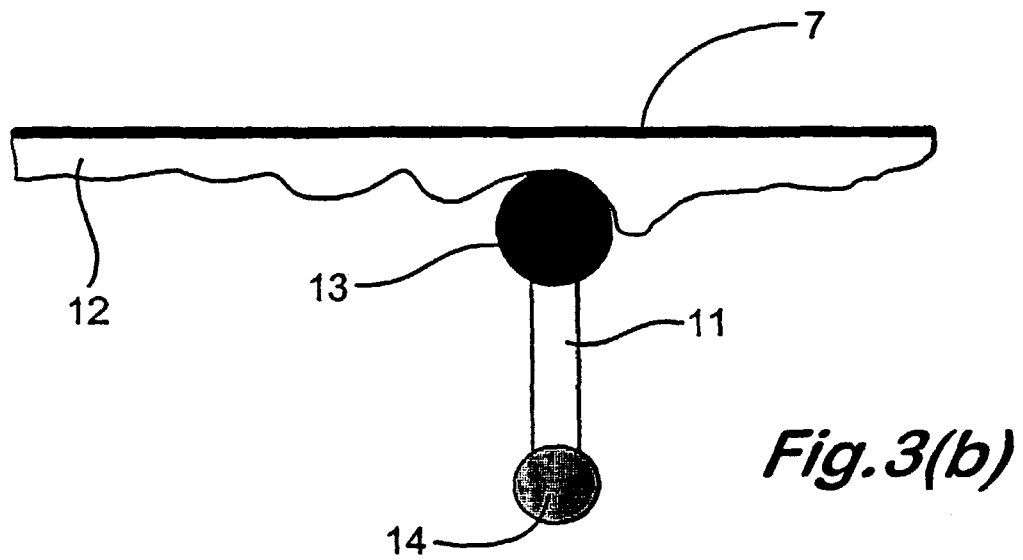

Referring now to FIG. 3(*a*), and in accordance with the invention, freely mobile elements, such as 6, of flexible membrane are released into a pipe 7, part of the bottom wall of which is shown at 8. The surface of wall 8 is shown as being roughened by the presence of sediment, scaling and/or other deposits.

The elements such as 6 resemble tadpoles, and typically take the form of small streamers or flow socks. In this example, each element such as 6 is provided with one or more floats such as 9 and 10. Preferably the various elements such as 6 are provided with respective pairs of floats having different buoyancy characteristics, so that different elements will be borne at differing heights within the pipe, thereby to increase the probability that wherever, around the circumference of a pipe, a leak may exist, one or more elements is or are disposed and presented so as to be captured by the localised pressure differential attributable to the leak and pulled into sealing relationship with the leakage aperture.

In FIG. 3(*a*), the element 6 is provided with a relatively large float 9 of negative buoyancy and a relatively small float 10 of positive buoyancy. In these circumstances, the net buoyancy is negative, so the element 6 tends to bump along the bottom wall 8, driven by the fluid flow. The small, positively buoyant float 10, however, allows the flow-based inertial forces within the pipe to move the element 6 if it has become trapped in the roughness on the pipe wall. Once near a leak, the differential pressure forces will dominate over the inertial forces and so the element (provided it is suitably dimensioned) will be drawn into position to seal the leak, and will be held there. As before, a suitable bonding agent may be borne by the element 6 to ensure its firm adhesion at the desired location. Usefully, elements such as 6 of differing sizes may be introduced into the pipe 7; and in some circumstances it is preferred to introduce the elements in size groups, starting with the largest. This strategy reduces the risk of small elements being drawn out through a leakage aperture and thus lost to the system.

FIG. 3(*b*) shows another tadpole-like element 11 which is inversely constructed as regards buoyancy to the element 6, and is thus caused to bump along the top wall 12 of the pipe 7. The element 11 has a relatively large positively buoyant float 13 and a relatively small negatively buoyant float 14, but operates in a similar way to the float 6.

In operation, a large number of elements such as 6 and 11, and including others, as aforesaid, with differing buoyancy characteristics, is released into the fluid flow upstream of a zone of pipework to be treated. These elements travel downstream with the fluid flow and one or more of them will be attracted to and seal, or at least stem, any leaks in that zone. This is illustrated schematically in FIG. 4.

Those elements which are not captured by a pressure differential associated with a leak travel further downstream and, if necessary, are collected by means of a net or other suitable trap installed across the pipe at a convenient access location, such as a valve access point.

In order to deal effectively with leaks located at one side or the other (at around mid-height) in some types of pipework, it can be advantageous to link together two or more sealing devices of equal or predetermined relative buoyancy; the linked devices thus being encouraged to flow at a selected position within the pipe, depending in part upon the length of the link. The linking connection may be so constructed as to dissolve or change in length during exposure, over a prescribed period of time, to the fluid content of the pipe.

Figure 9:
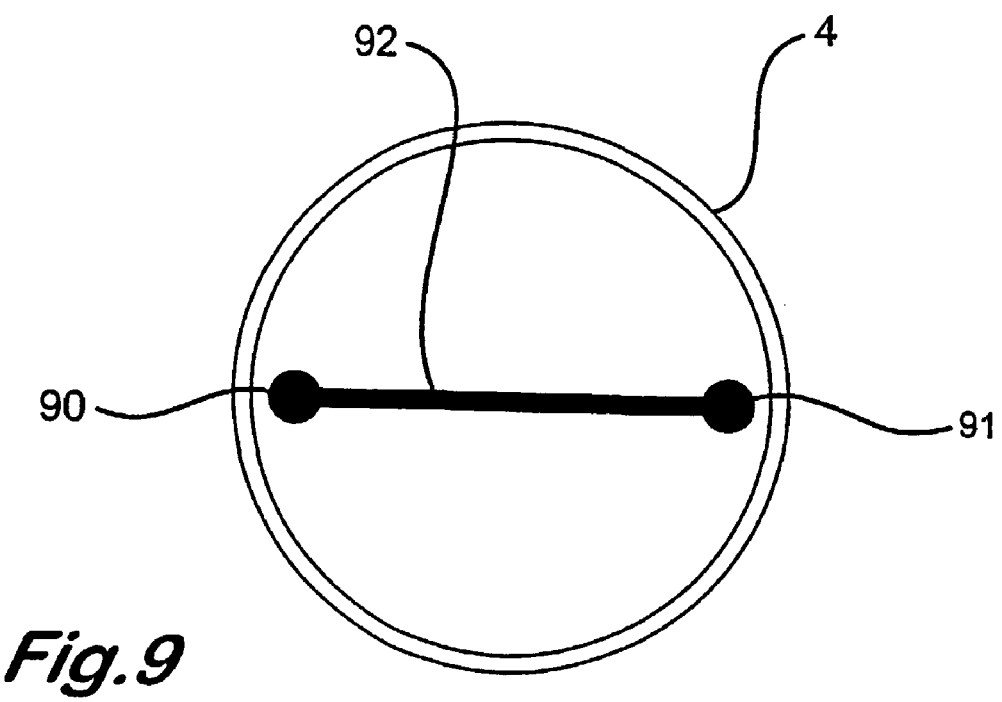
FIG. 9 illustrates schematically, and cross-sectionally of a pipe, a composite sealing element for use in certain embodiments of the invention.

FIG. 9 shows that the equilibrium position for the sealing elements 90, 91 would be at the mid-height of the pipe 1 as the elements are of equal buoyancy and, because of the length of the linking connection 92, they cannot position themselves in any other arrangement. Likewise, positively buoyant sealing elements linked with a connection shorter than connection 92 will naturally float closer to the top of the pipe 1.

If the connection such as 92 is such as to be dissolved by the fluid flowing in the pipe, then in the event that one of the elements 90 or 91 is attracted to a leak, the other will eventually become detached and be carried away, thereby removing any tendency for the flow of fluid past the linked elements to pull the sealing element out of the leak to which it has become attached. If, on the other hand, the link 92 were constructed so as to shorten significantly, the link can be configured to fold over, allowing the two elements 90 and 91 to bond together and jointly contribute to the seal.

It is indeed possible to utilise sealing elements of a number of configurations, such as frustoconical, rectangular, tubular etc., with varying material stiffness and some with interconnecting links as just described.

The efficiency of the sealing process may be enhanced by reducing the flow rate of fluid in the pipe zone being treated, whilst maintaining the operative pressure. This increases the probability of elements being entrained into the leakage aperture by the pressure differential associated with the leak, since that pressure, in such circumstances, becomes very much the dominant force acting upon the relevant elements.

In one practical test of the first-described arrangement above, a pipework loop containing water pressurised to 1.4 bar was provided with a leak of diameter 10 mm, giving a leakage rate of 0.7 l/s. A windsock-shaped sealing element such as that shown in FIG. 1 of front diameter 80 mm; rear diameter 20 mm and length 300 mm was attached to a sensor device, or "fish" as it is typically called, using four lengths of cable, each 400 mm in length. When the fish was dragged past the leak, the windsock-shaped element was sucked to the leak and sealed it completely, reducing the leakage to zero.

When dragged further past the leak, the nose of the windsock was found actually to enter the leakage hole.

The performance in sealing the aforementioned leak is impressive, particularly when it is borne in mind that the pressure in standard mains water pipes can be as high as 16 bar, so the capturing of the element by the leak and its subsequent sealing effect can be expected to be even more effective under such conditions.

Some or all of the sealing elements are preferably constructed so as to be capable of use with a signalling system for leak and/or positional detection purposes. Such elements (hereinafter referred to as "tagged elements") may either transmit under their own power to a remote location outside of the pipe; transmit to a pipework-borne transponder which in turn transmits (either automatically or in response to an interrogating stimulus) to the remote location; or transmit within the pipe for detection by an intelligent unit traversing the pipe. As a further alternative, a tagged element may merely contain an electrically conductive loop which is sensed by an intelligent unit traversing the pipe and/or by external sensors, in a technical sense rather in the manner of security tags used in departmental stores and the like.

In general, the tagging technology used may be active (requiring an on-board power source) or passive (not requiring an on-board power source). Moreover, any convenient signalling technology may be adopted, depending upon various criteria such as the fluid flowing in the pipe, the materials, dimensions and condition of the pipework, the environment surrounding the pipework and so on. Candidate technologies include the transmission and/or reception of electrical, electronic, magnetic, electromagnetic, optical, vibrational, acoustic, or ultrasonic signals and chemical or radioactive markers.

Where passive tagging is employed, it is preferred that an intelligent unit (sometimes called a pipeline PIG) is caused to traverse the pipe and is provided with sensors to detect the presence of the passive tag. Once detected, this information is correlated with the PIG's distance travelled and/or other information that provides an accurate position for the leak. The positional information may be transmitted by the PIG in real time to an external location where it can be detected and the information used straight away, or stored on the PIG for later analysis.

If the tag is active, it may be used by itself to transmit signals via any convenient medium, such as along or through the pipe wall, though the fluid in the pipe, and/or through the environment surrounding the pipework. If pulsed signals are transmitted, timing processes can be used to evaluate distance. Any information transmitted externally of the pipework may be routed to a remote receiver via transponders supported on, or close to, the pipework, or they may be picked up directly by detector/receivers placed close to the pipework.

In the case of buried pipework, detector/receivers may be lowered into test bores made close to a suspected leak site.

The invention claimed is:

1. A method of controlling leakage of fluid from a duct along which said fluid is constrained to flow, wherein a plurality of individual sealing elements comprising a flexible membrane and one or more floats at an end of the flexible membrane are introduced into the duct and carried along the duct by the flow of said fluid; and wherein, at the locality of a leak, at least one of said sealing elements is captured by a pressure differential associated with the leak and is thereby drawn to and held in position at the leak for stemming or sealing the leak.

2. Apparatus for controlling leakage of fluid from a duct along which said fluid is constrained to flow, said apparatus comprising a plurality of individual sealing elements comprising a flexible membrane and one or more floats at an end of the flexible membrane for introduction into the duct, and capable of being carried along the duct by the flow of said fluid, wherein, at the locality of a leak, at least one of said sealing elements is capable of being captured by a pressure differential associated with the leak and thereby drawn to and held in position at the leak for stemming or sealing the leak.

3. Apparatus according to claim 2 further comprising a float at respective ends of said flexible membrane, said floats exhibiting differing buoyancies.

4. Apparatus according to claim 2 wherein different flexible membranes, exhibit differing shapes.

5. Apparatus according to claim 2 wherein different flexible membranes, exhibit differing sizes.

6. Apparatus according to claim 2 wherein the sealing elements support a medium capable of adhering strongly to the duct when forced into contact therewith, thereby anchoring the sealing elements firmly in place across the leaking area of the duct wall and sealing the leak.

7. Apparatus according to claim 6 wherein said medium comprises a bonding agent.

8. Apparatus according to claim 7 wherein the bonding agent is contained in microcapsules which burst in response to the pressure imparted to the sealing elements when in position to seal the leak.

* * * * *